(12) United States Patent
Yuan et al.

(10) Patent No.: US 9,640,312 B2
(45) Date of Patent: May 2, 2017

(54) MULTI-PHASE COMMON MODE CHOKE

(71) Applicant: GENERAL ELECTRIC COMPANY, Schenectady, NY (US)

(72) Inventors: Zhihui Yuan, Munich (DE); Xiaoting Dong, Munich (DE); Jie Shen, Munich (DE); Stefan Schroeder, Munich (DE); Konrad Roman Weeber, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 176 days.

(21) Appl. No.: 14/462,972

(22) Filed: Aug. 19, 2014

(65) Prior Publication Data
US 2016/0055956 A1  Feb. 25, 2016

(51) Int. Cl.
| | |
|---|---|
| H01F 30/12 | (2006.01) |
| H01F 27/24 | (2006.01) |
| H01F 27/28 | (2006.01) |
| H01F 17/04 | (2006.01) |
| H01F 37/00 | (2006.01) |
| H02M 1/12 | (2006.01) |

(52) U.S. Cl.
CPC ............ *H01F 27/28* (2013.01); *H01F 30/12* (2013.01); *H01F 37/00* (2013.01); *H02M 1/126* (2013.01); *H02M 2001/123* (2013.01)

(58) Field of Classification Search
CPC .................................. H01F 5/00; H01F 27/28
USPC ............................. 336/5, 211, 220, 221, 222
See application file for complete search history.

(56) References Cited

U.S. PATENT DOCUMENTS

| | | | | |
|---|---|---|---|---|
| 1,706,193 A | * | 3/1929 | Stephens | ............... H01F 27/289 |
| | | | | 307/17 |
| 3,579,165 A | * | 5/1971 | Johnson | .................. H01F 27/28 |
| | | | | 336/170 |
| 3,745,440 A | | 7/1973 | Lord | |
| 5,581,224 A | | 12/1996 | Yamaguchi | |
| 6,049,266 A | * | 4/2000 | Hoshino | ................... G05F 1/24 |
| | | | | 336/180 |
| 6,917,271 B2 | | 7/2005 | Zhang et al. | |
| 2012/0106210 A1 | | 5/2012 | Xu et al. | |
| 2013/0242623 A1 | | 9/2013 | Wei et al. | |

FOREIGN PATENT DOCUMENTS

| | | | | |
|---|---|---|---|---|
| BE | FR 2765725 A1 | * | 1/1999 | ............... H02J 3/01 |
| CN | 202077249 U | | 12/2011 | |
| CN | 202094796 U | | 12/2011 | |

(Continued)

OTHER PUBLICATIONS

Sivakumar et al., "A Three Level Voltage Space Vector Generation for Open End Winding IM Using Single Voltage Source Driven Dual Two-Level Inverter", TENCON 2009-2009 IEEE Region 10 Conference, pp. 1-5, Jan. 2009.

(Continued)

*Primary Examiner* — Tsz Chan
(74) *Attorney, Agent, or Firm* — Nitin N. Joshi

(57) ABSTRACT

A common mode choke includes at least two groups of multi-phase coils wound on a magnetic core for balancing differential mode inductance between the phases. The multi-phase coils in each group are series connected and concentrically wound on a respective portion of the magnetic core. Each group of multi-phase coils is non-overlapping with each other group of multi-phase coils.

7 Claims, 4 Drawing Sheets

(56) References Cited

FOREIGN PATENT DOCUMENTS

| DE | 102008031296 A1 | | 8/2009 |
|---|---|---|---|
| DE | 102008046576 A1 | | 3/2010 |
| DE | 102011086112 A1 | | 5/2013 |
| EP | 0788216 A2 | | 8/1997 |
| EP | 2068430 A2 | | 6/2009 |
| FR | 2765725 A1 | | 1/1999 |
| JP | 06053060 A | * | 2/1994 |

OTHER PUBLICATIONS

Heldwein et al., "The Three-Phase Common-Mode Inductor: Modeling and Design Issues", Industrial Electronics, IEEE Transactions on (vol. 58, Issue: 8), pp. 3264-3274, Aug. 2011.
DE102008031296 (A1)—English Abstract.
DE102008046576 (A1)—English Abstract.
CN202077249 (U)—English Abstract.
CN202094796 (U)—English Abstract.
DE102011086112 (A1)—English Abstract.
European Search Report and Written Opinion issued in connection with corresponding EP Application 15181336.7 on Feb. 8, 2016.

* cited by examiner

MULTI-PHASE COMMON MODE CHOKE

BACKGROUND

The subject matter of this disclosure relates generally to common mode chokes, and more particularly, to a three-phase common mode choke structure suitable for use in high power applications.

Three-phase common mode chokes may be used as a common mode filter in medium voltage (MV) large power rating drives. Such common mode chokes may be a key component for an MV drive without a transformer.

Ferrite ring cores are generally no longer a suitable core for common mode chokes as transmission power levels continue to increase. These increasing transmission power levels may influence the use of core and winding materials, and may necessitate the use of core and winding materials more suitable for high power magnetic devices.

Further, a special winding arrangement may be required for a multi-phase choke such as a three-phase common mode choke when used at certain high transmission power levels. The absence of such special winding arrangements may otherwise cause extreme overheating, or result in undesirably strong unbalanced differential mode inductance between different phases.

In view of the foregoing, there is a need for a multi-phase common mode choke such as a three-phase common mode choke that is suitable for use with high power transmission applications and that substantially controls and balances differential mode inductance between different phases of the common mode choke to reduce or eliminate system asymmetry.

BRIEF DESCRIPTION

According to one embodiment, a common mode choke comprises:
 a magnetic core; and
 at least two groups of multi-phase coils, the multi-phase coils in each group being series connected and concentrically wound on the magnetic core.

According to another embodiment, a common mode choke comprises:
 a magnetic core; and
 at least two groups of multi-phase coils, the multi-phase coils in each group being series connected and concentrically arranged on the closed frame magnetic core for balancing differential mode inductance between the phases.

According to yet another embodiment, a common mode choke comprises:
 a magnetic core; and
 at least two groups of series connected multi-phase coils, each group of series connected multi-phase coils comprising a plurality of coils concentrically wound on the magnetic core, wherein each group of multi-phase coils comprises an inner coil, an outer coil and at least one coil disposed between the inner and outer coils when the multi-phase coils comprise at least three-phase coils, and further wherein the inner coil comprises a different number of winding turns than the outer coil.

DRAWINGS

These and other features, aspects, and advantages of the present invention will become better understood when the following detailed description is read with reference to the accompanying drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
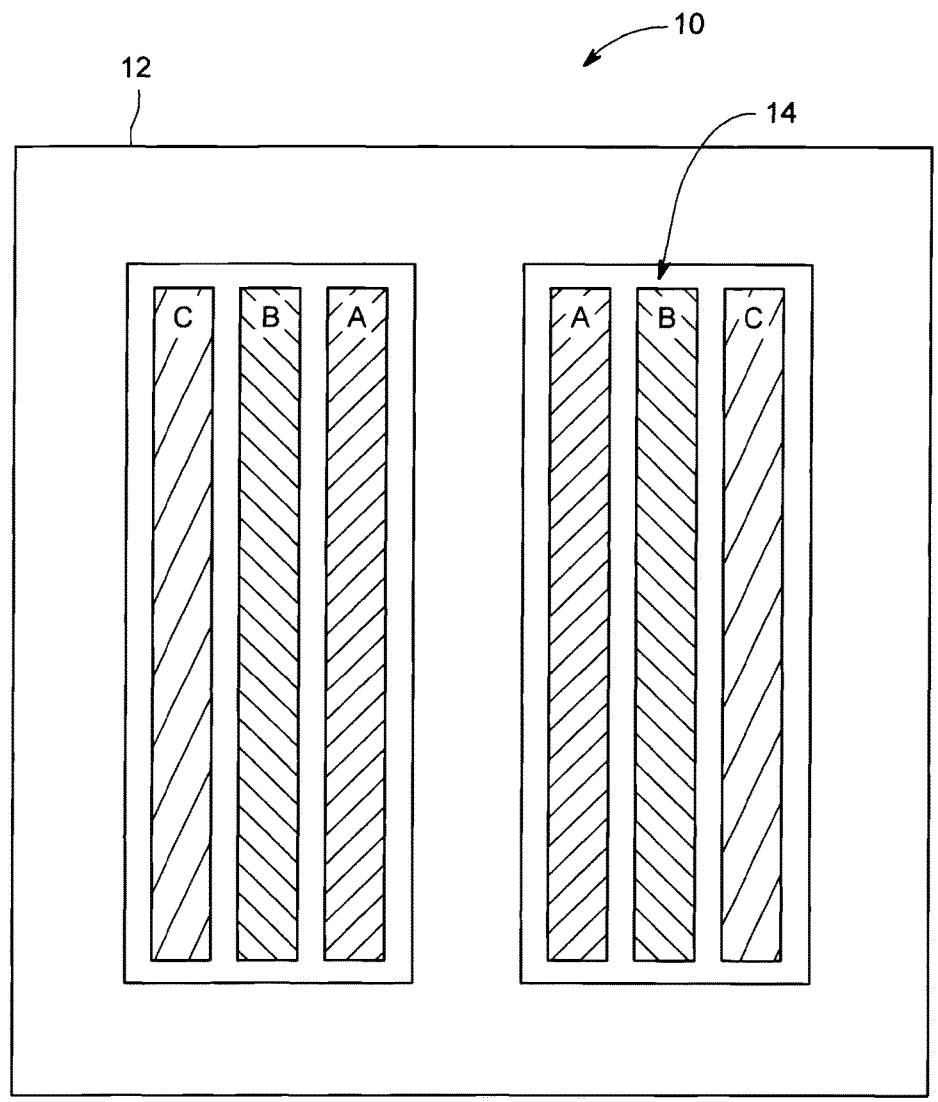
FIG. 1 is a plan view illustrating a three-phase common mode choke winding arrangement on a magnetic E core, and that is known in the art.

FIG. 1 is a plan view illustrating a three-phase common mode (CM) choke 10 winding arrangement on a magnetic E core 12, and that is known in the art. The three-phase CM choke 10 has a single three-phase winding group 14 arranged concentrically on the magnetic E core 12. The three-phase CM choke 10 winding arrangement presents challenges due to excessive unbalanced differential mode inductance between different phases when used as a common mode filter in medium voltage (MV) large power rating drives.

Figure 2:
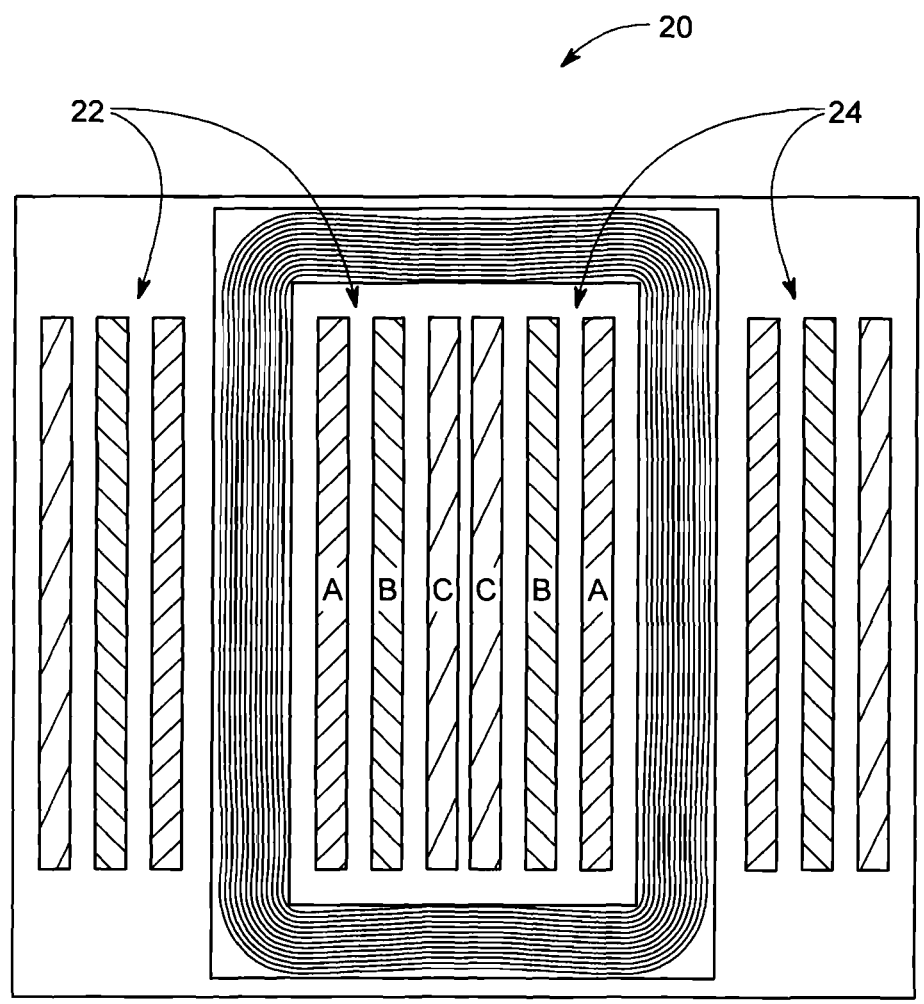
FIG. 2 is a plan view illustrating another three-phase common mode choke winding arrangement that is known in the art.

FIG. 2 is a plan view illustrating another three-phase common mode choke 20 winding arrangement that is known in the art. The three-phase CM choke 20 has a pair of three-phase winding groups 22, 24. Winding group 22 is symmetric with winding group 24. Although the winding arrangement associated with three-phase CM choke 20 results in a reduction in unbalanced differential mode inductance between different phases, this reduction may not be sufficient for use as a common mode filter in certain MV large power rating drive applications. The resultant unbalanced differential mode inductance between the different phases may disadvantageously cause overheating and a reduction in efficiency.

Figure 3:
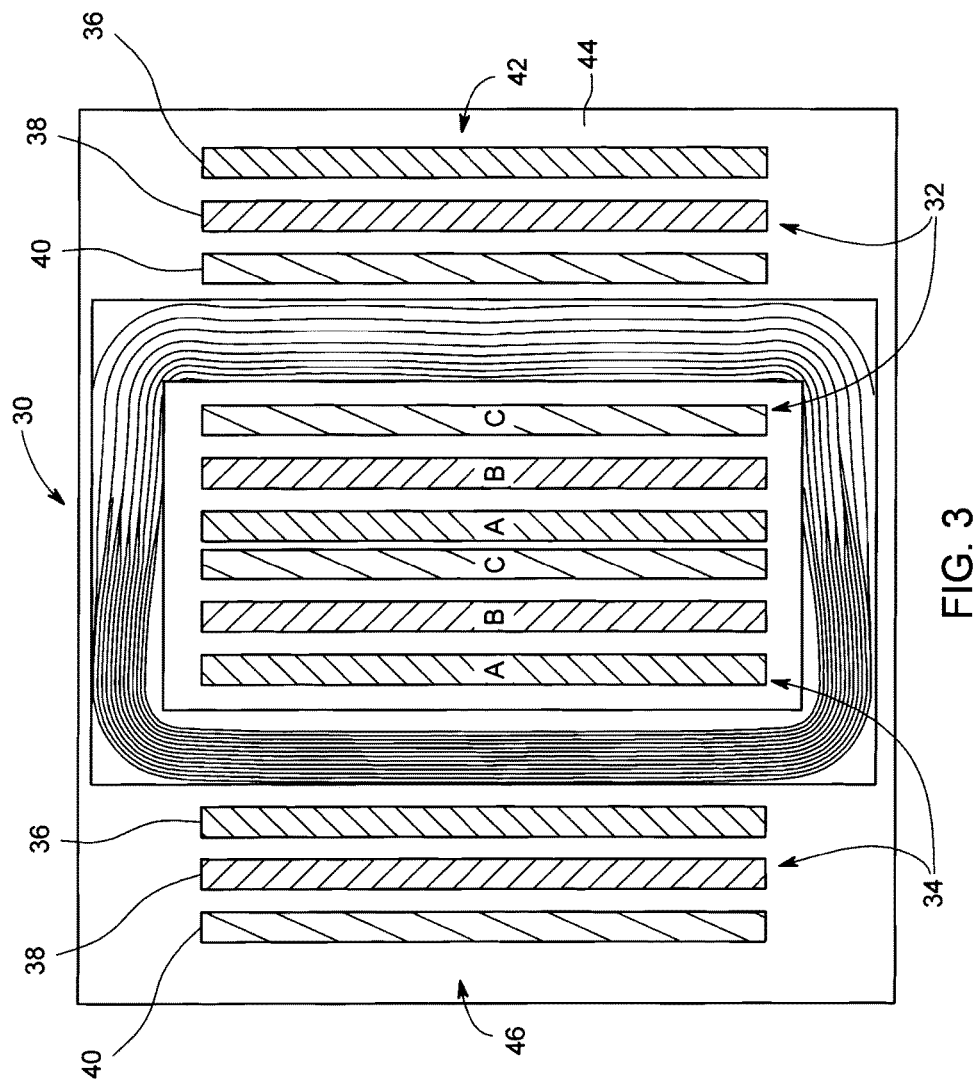
FIG. 3 is plan view illustrating a three-phase common mode choke winding arrangement, according to one embodiment.

FIG. 3 is plan view illustrating a three-phase common mode choke 30 winding arrangement, according to one embodiment. Test results described herein show the resultant unbalanced differential mode inductance between different phases of the winding arrangement associated with three-phase CM choke 30 is substantially less than the resultant unbalanced differential mode inductance between the different phases associated with three-phase CM choke 20.

The three-phase CM choke 30 comprises two three-phase winding groups 32, 34. Each three-phase winding group comprises a phase A winding/coil 36, a phase B winding/coil 38 and a phase C winding/coil 40. The inner winding/coil of the three-phase winding group 32 comprises a phase C winding/coil 40. The middle winding of the three-phase winding group 32 comprises a phase B winding/coil 38. The outer winding of the three-phase winding group 32 comprises a phase A winding/coil 36. The inner winding of the three-phase winding group 34 comprises a phase A winding/coil 36. The middle winding of the three-phase winding group 34 comprises a phase B winding/coil 38. The outer winding of the three-phase winding group 34 comprises a phase C winding/coil 40. The phase windings A, B, C in each group 32, 34 are series connected according to one embodiment.

Three-phase winding group 32 is concentrically wound on a first portion 42 of a magnetic core 44, while winding group 34 is concentrically wound on a second portion 46 of the magnetic core 44 that is different from the first portion 42 of the magnetic core 44.

According to one embodiment, a further reduction of the resultant unbalanced differential mode inductance between different phases of the winding/coil arrangement associated with three-phase CM choke 30 results by using a first number of inner winding turns (Tin) and a second number of outer winding turns (Tout), wherein the first number of inner winding turns is different from the second number of outer winding turns. According to another embodiment, a relationship between the winding turns found suitable to further balance the differential mode inductance between the phases may be represented as $2*Tm=Tin+Tout$, wherein Tm is the number of middle winding turns.

Figure 4:
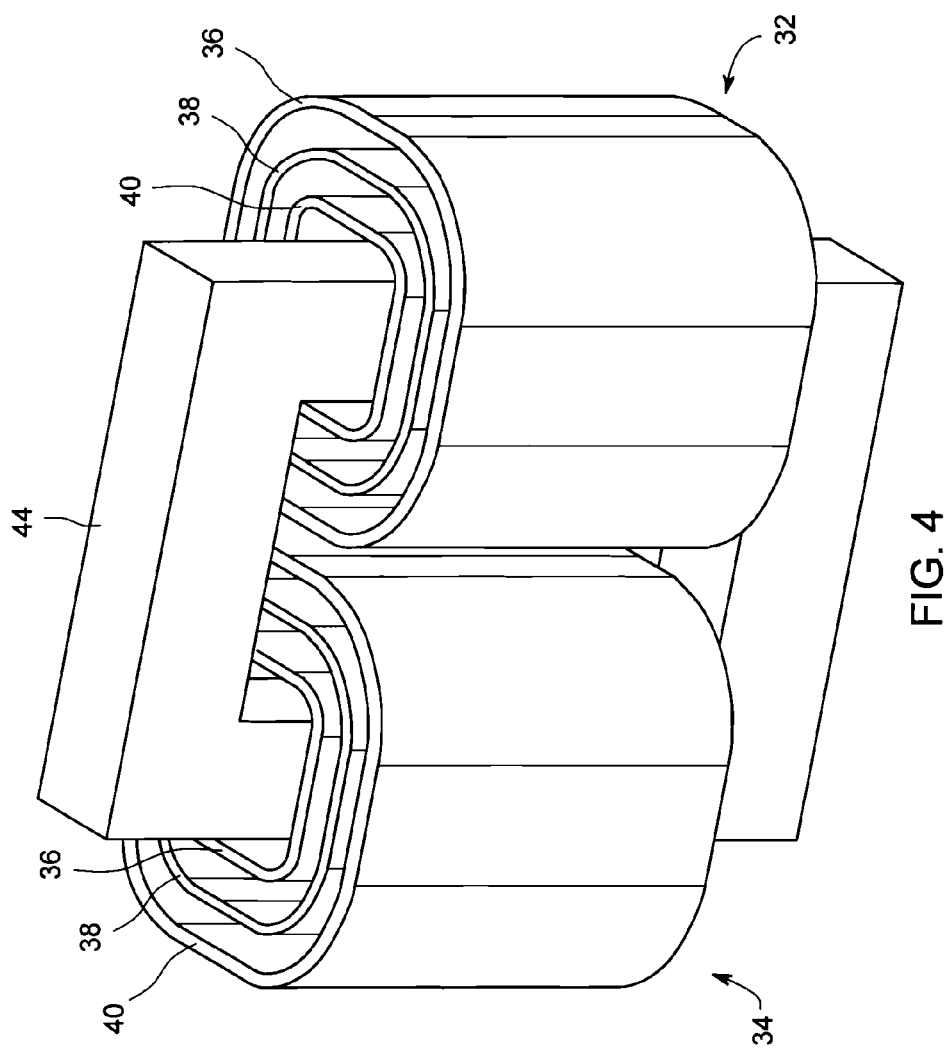
FIG. 4 is a perspective view of the three-phase common mode choke winding arrangement shown in FIG. 3.

FIG. 4 is a perspective view of the three-phase common mode choke 30 winding arrangement shown in FIG. 3. According to one aspect, the outer phase A winding/coil 36 of three-phase winding group 32 comprises the same number of turns as the inner phase A winding/coil 36 of three-phase winding group 34, the middle phase B winding/coil 38 of three-phase winding group 32 comprises the same number of turns as the middle phase B winding/coil 38 of three-phase winding group 34, and the inner phase C winding 40 of three-phase winding/coil group 32 comprises the same number of turns as the outer phase C winding/coil 40 of three-phase winding/coil group 34. Thus, the phase windings/coils in winding/coil group 32 are arranged differently relative to each other when compared to the phase windings/coils in winding/coil group 34.

Although the embodiments described herein can be seen to use a closed magnetic core frame structure 44, it will be appreciated that other core frame structures can just as easily be used according to the principles described herein. Although magnetic core 44, for example, comprises a square or rectangular shaped core frame with an open center, a pair of C-shape magnetic core elements could just as easily be used to implement a square or rectangular shaped closed core frame simply by joining the open ends of one C-shape core element of the pair with the open ends of the other C-shape core element. Such an arrangement in some embodiments may result in one or more small air gaps between the joining frame portions, while still providing a substantially closed core structure. It can be appreciated that a C-shape core frame and an E-shape core frame each have open core frame structures, while a square or rectangular shape core frame each has a closed structure. Some embodiments may employ and open core structure such as, without limitation, an E-shape core or a C-shape core, using the principles described herein depending upon the application.

In summary explanation, a common mode choke 30 according to one embodiment comprises a magnetic core 44 and at least two groups of series connected three-phase windings/coils 32, 34, each group 32, 34 concentrically wound on the magnetic core 44 and arranged on the magnetic core 44 for balancing differential mode inductance between the three phases A, B C. Each group of series connected three-phase windings/coils 32, 34 may comprise an inner coil, an outer coil and a middle coil disposed between the inner and outer coils. The inner coil may comprise a different number of winding turns than the outer coil.

It can be further appreciated that while certain embodiments have been described herein with reference to three-phase windings/coils, other embodiments may comprise multi-phase windings/coils other than three-phase windings/coils, e.g. two-phase, four-phase, etc., using the principles described herein.

Further, some embodiments may comprise sandwiched windings. Two phase A windings may be disposed on one leg of the magnetic core 44 for example, wherein one of the phase A windings accommodates an upside to downside current, while the other phase A winding accommodates a downside to upside current.

According to another embodiment using sandwiched windings, multiple winding sets may be disposed on one leg of the magnetic core 44. For example, one leg may comprise a (A, B, C)(C, B, A) winding pattern, while a second leg may comprise a (C, B, A)(A, B, C) winding pattern.

While the invention has been described in terms of various specific embodiments, those skilled in the art will recognize that the invention can be practiced with modification within the spirit and scope of the claims.

The invention claimed is:
1. A common mode choke comprising:
a magnetic core including a first portion and a second portion;
a first group of multi-phase coils;
a second group of multi-phase coils;
wherein each of the first group of multi-phase coils and the second group of multi-phase coils includes an inner coil and an outer coil that are concentrically wound on the magnetic core; and
wherein the inner coil of the first group of multi-phase coils is series connected to the outer coil of the second group of multi-phase coils and the outer coil of the first group of multi-phase coils is series connected to the inner coil of the second group of multi-phase coils to balance differential mode inductance between the phases.
2. The common mode choke according to claim 1, wherein each of the first group of multi-phase coils and the second group of multi-phase coils includes a middle coil disposed within the inner and outer coils; and
wherein the middle coil of the first group of multi-phase coils is series connected to the middle coil of the second group of multi-phase coils.
3. The common mode choke according to claim 1, wherein each group of multi-phase coils is non-overlapping with each other group of multi-phase coils.
4. The common mode choke according to claim 1, wherein the inner coil of the first group of multi-phase coils comprises a different number of winding turns than the number of winding turns associated with the outer coil of the first group of multi-phase coils.
5. The common mode choke according to claim 4, wherein a relationship between the number of winding turns associated with at least one group of multi-phase coils may be represented as $2*Tm=Tin+Tout$, wherein Tin is the number of winding turns of the inner coil, Tm is the number of winding turns of the middle coil, and Tout is the number of winding turns of the outer coil.
6. The common mode choke according to claim 1, wherein the magnetic core comprises a plurality of legs, and further wherein a plurality of groups of multi-phase coils are disposed together on each leg of the magnetic core.
7. The common mode choke according to claim 4, wherein the inner coil of the second group of multi-phase coils comprises a different number of winding turns than the number of winding turns associated with the outer coil of the second group of multi-phase coils.

* * * * *